(12) United States Patent
An et al.

(10) Patent No.: US 11,024,930 B2
(45) Date of Patent: Jun. 1, 2021

(54) BATTERY WITH A BUFFER LAYER ADHERED TO SEPARATORS

(71) Applicant: Ningde Amperex Technology Limited, Fujian (CN)

(72) Inventors: Jiaxin An, Fujian (CN); Fen Tao, Fujian (CN); Zhengde Zhang, Fujian (CN); Jinhua He, Fujian (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 117 days.

(21) Appl. No.: 16/174,246

(22) Filed: Oct. 29, 2018

(65) Prior Publication Data

US 2019/0319253 A1    Oct. 17, 2019

(30) Foreign Application Priority Data

Apr. 13, 2018 (CN) .......................... 201820526120.9

(51) Int. Cl.
*H01M 50/579* (2021.01)
*H01M 10/0585* (2010.01)
*H01M 50/103* (2021.01)
*H01M 50/463* (2021.01)
*H01M 10/0525* (2010.01)

(52) U.S. Cl.
CPC ..... *H01M 50/579* (2021.01); *H01M 10/0585* (2013.01); *H01M 50/103* (2021.01); *H01M 50/463* (2021.01); H01M 10/0525 (2013.01); H01M 2220/30 (2013.01)

(58) Field of Classification Search
CPC ............ H01M 50/116; H01M 50/579; H01M 50/103; H01M 50/557; H01M 50/463
See application file for complete search history.

(56) References Cited

U.S. PATENT DOCUMENTS

| | | | |
|---|---|---|---|
| 6,743,546 B1* | 6/2004 | Kaneda ................. | H01M 2/021 429/127 |
| 2003/0148174 A1* | 8/2003 | Gu ..................... | H01M 10/0436 429/129 |
| 2011/0287301 A1* | 11/2011 | Kim .................. | H01M 10/0413 429/160 |
| 2014/0170470 A1* | 6/2014 | Jeong ................. | H01M 2/0212 429/163 |
| 2015/0147626 A1* | 5/2015 | Tajima .................... | H01M 2/18 429/139 |

* cited by examiner

*Primary Examiner* — Stewart A Fraser
(74) *Attorney, Agent, or Firm* — Morgan, Lewis & Bockius LLP

(57) ABSTRACT

The present application provides a battery and an electronic device thereof. The battery comprises: a electrode assembly having at least one separator protrusion; a package bag for accommodating the electrode assembly; and a buffer layer arranged between the electrode assembly and the package bag; wherein the buffer layer is further arranged on the at least one separator protrusion. The purpose of the present application is to provide a battery and an electronic device thereof which are capable of improving the drop resistance performance of the battery and improving the safety performance of its use.

20 Claims, 10 Drawing Sheets

BATTERY WITH A BUFFER LAYER ADHERED TO SEPARATORS

CROSS-REFERENCE TO RELATED APPLICATIONS

The present application claims priority to and benefits of Chinese Patent Application No. 201820526120.9, filed on Apr. 13, 2018, the content of which is incorporated herein by reference in its entirety.

FIELD OF THE INVENTION

The present application relates to the field of battery, in particular, to a battery and an electronic device thereof.

BACKGROUND OF THE INVENTION

As energy density of the battery increases, there is an increasing demand for battery safety performance. When the mobile phone is often dropped during use, or there is a similar slight drop during transportation, the top of the electrode assembly is caused to be punched out, the top of the electrode assembly to be impacted and the separator to shrink, etc., further internal short-circuit is caused, which may cause serious startup problems and even safety problems such as fire and explosion. Therefore, battery safety issues cannot be ignored.

The structure of the bare electrode assembly 10 currently in common use is shown in FIG. 1. The above problems will often occur during the falling process. In order to solve these problems, the existing method is to bond the electrode assembly and the package bag together in a battery assembly process to prevent the electrode assembly from moving in the package bag during the falling process, thereby avoiding the above phenomenon and a further problem of internal short circuit. However, the existing method tends to cause the risk of short circuit caused by tearing the aluminum foil inside the electrode assembly, and this method does not improve the internal short circuit caused by the shrinkage of the separator of the separator protrusion inside the electrode assembly.

SUMMARY OF THE INVENTION

In view of the problems in the prior art, the object of the present application is to provide a battery capable of avoiding the risk of short circuit occurring inside the electrode assembly caused by tearing the aluminum foil during the falling process of the battery, and also improving the internal short circuit caused by the shrinkage of the separator of the separator protrusion inside the electrode assembly during the falling process of the battery, further maximizing the drop resistance performance of the battery so as to improve the safety of its use.

The technical solution of the present application is implemented as follows:

According to an aspect of the present application, a battery is provided comprising:

an electrode assembly having at least one separator protrusion;

a package bag for accommodating the electrode assembly; and a buffer layer arranged between the electrode assembly and the package bag;

wherein the buffer layer is further arranged on the at least one separator protrusion.

According to an embodiment of the present application, the battery further comprises an adhesive layer; the buffer layer is adhered to the at least one separator protrusion by the adhesive layer, the at least one separator protrusion includes a first separator protrusion and a second separator protrusion, and the adhesive layer extends between the first separator protrusion and the second separator protrusion.

According to an embodiment of the present application, the battery further comprises an electrode tab, and the buffer layer has a notch, the electrode tab passes through the notch.

According to an embodiment of the present application, the battery further comprises an electrode tab, and the buffer layer has a through hole, the electrode tab passes through the through hole.

According to an embodiment of the present application, the buffer layer has an elastic modulus between 1 MPa and 1000 MPa.

According to an embodiment of the present application, the length of the through hole is between 1 mm and 10 mm greater than the width of the electrode tab, and the length direction of the through hole is parallel to the width direction of the electrode tab.

According to an embodiment of the present application, the length of the notch is between 1 mm and 10 mm greater than the width of the electrode tab, and the length direction of the notch is parallel to the width direction of the electrode tab.

According to an embodiment of the present application, the length of the buffer layer is between 0 mm and 10 mm less than the width of the electrode assembly, and the length direction of the buffer layer is parallel to the width direction of the electrode assembly.

According to an embodiment of the present application, a thickness of the buffer layer is between 0.1 mm and 5 mm.

According to an embodiment of the present application, the material of the buffer layer includes an elastic substance.

According to an embodiment of the present application, the elastic substance may be a rubber pad or a foam.

According to an embodiment of the present application, the material of the rubber pad is at least one selected from a group consisting of polyvinylidene fluoride, polyethylene, polypropylene, styrene butadiene rubber and organic silica gel.

According to an embodiment of the present application, the electrode assembly is a single tab structure or a multi-tab structure.

In addition, according to another aspect of the present application, an electronic device is further provided comprising: a case and a battery disposed in the case; the battery includes:

an electrode assembly having at least one separator protrusion;

a package bag for accommodating the electrode assembly; and a buffer layer arranged between the electrode assembly and the package bag;

wherein the buffer layer is further arranged on the at least one separator protrusion.

The beneficial effects of the present application are as follows:

In the battery of the present application, a buffer layer is arranged on the separator protrusion of the electrode assembly. Since the buffer layer has an elastic buffering effect, the buffer layer may absorb the impact kinetic energy of the electrode assembly and the impact force on the electrode assembly during the falling process of the battery, prevent the battery from directly colliding with the separator protrusion (e.g. a separator protrusion at the top seal) of the electrode assembly during the falling process, slow down the impact and wear on the electrode assembly plate and separator, and avoid the risk of internal short circuit caused by displacement between the cathode and anode plates of the electrode assembly and shrinkage of the separator (the improvement at the top seal is especially obvious), thereby enhancing the battery's impact resistance performance and improving the battery's drop resistance performance, further improving the battery safety performance.

In addition, the buffer layer may also be adhered to the separator protrusion of the electrode assembly through the adhesive layer, and the adhesive layer may overflow when the electrode assembly is forming, then the adhesive layer may extend between the first separator protrusion and the second separator protrusion of the separator protrusion, so that the buffer layer and the separator protrusion may be more firmly bonded together, thereby further enhancing the impact resistance performance of the electrode assembly plate and the separator at the protrusion of the separator, further preventing the separator from shrinking. At the same time, the impact of the electrolytic solution on the separator protrusion may be protected, thereby further avoiding the risk of internal short circuit inside the battery, further enhancing the impact resistance performance of the battery and improving the drop resistance performance of the battery, thereby further improving the safety of the battery, and the head collapse of the package aluminum foil is improved to some extent and the risk of short circuit caused by tearing the aluminum foil inside the electrode assembly is avoided.

BRIEF DESCRIPTION OF THE DRAWINGS

In order to be more clearly illustrating the technical solutions of embodiments of the present application or prior art, the drawings which are required to be used in the description of the embodiments will be briefly described below. It is obvious that the drawings described below are only some embodiments of the present application. It will be apparent to one of ordinary skill in the art that other drawings may be obtained based on the accompanying drawings without inventive effort.

FIG. 2b illustrates a top view of the buffer layer of FIG. 2a;

FIG. 3b illustrates a top view of the buffer layer of FIG. 3a;

FIG. 5b illustrates a side view of the portion of FIG. 5a;

DETAILED DESCRIPTION OF THE PREFERRED EMBODIMENTS

Figure 1:
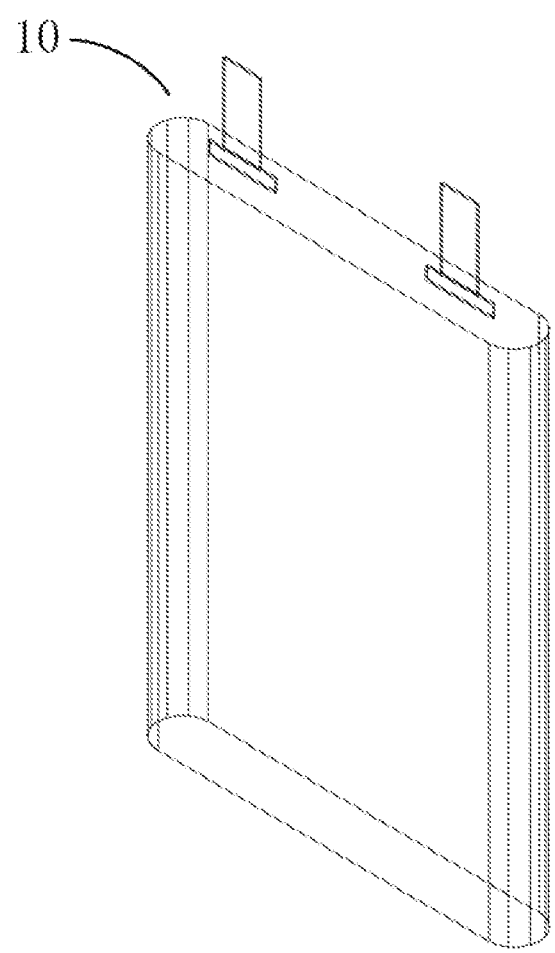
FIG. 1 illustrates a view of a bare electrode assembly in prior art.

The technical solutions in the embodiments of the present application will be clearly and completely described hereafter in connection with the drawings in the embodiments of the present application. It is apparent that the described embodiments are only a part of the embodiments of the present application, but not the whole. Based on the embodiments of the present application, all the other embodiments obtained by those of ordinary skill in the art are within the scope of the present application.

In the description of the present application, it is to be understood that the orientation or positional relationship indicated by the terms "center", "length", "lateral", "length", "width", "thickness", "upper", "lower", "front", "rear", "left", "right", "vertical", "horizontal", "top", "bottom", "inner", "outside", "clockwise", "counterclockwise", "axial", "radial" is based on the orientation or positional relationship shown in the drawings, and is merely for the convenience of describing the present application and the simplified description, and does not indicate or imply that the device or the element referred to must have a specific orientation and be constructed and operated in a specific orientation, and therefore is not to be construed as limiting the application. Furthermore, features defining "first" and "second" may include one or more of the features, either explicitly or implicitly. In the description of the present application, "a plurality" means two or more unless otherwise stated.

In the description of the present application, it should be noted that, terms like "mounted", "connected", "coupled" should be comprehended broadly unless otherwise specifically limited, for example, it may be coupled securely, also be coupled removably or integrally; it may be coupled mechanically, also be coupled electrically; it may be connected directly, also through a medium indirectly, may be the internal connection between two elements. The specific meaning of the terms in the present application may be understood by those of ordinary skill in the art due to certain situations. The embodiments of the present application will be specifically described below in conjunction with the accompanying drawings.

It should be noted that the following embodiments may be combined or partially replaced with each other in any possible manner.

With reference to FIG. 2a to FIG. 4, the present application provides a battery comprising an electrode assembly 20 and a package bag (not shown) for accommodating the electrode assembly 20, wherein the electrode assembly 20 has a separator protrusion 28 and the number of the separator protrusion 28 is at least one. The battery provided by the present application further comprises a buffer layer 22 arranged between the electrode assembly 20 and the package bag; wherein the buffer layer 22 is arranged on at least one separator protrusion 28 of the electrode assembly 20.

It should be understood that for the electrode assembly 20 described above, it includes a cathode electrode plate and an anode electrode plate as well as a separator. The cathode electrode plate and the anode electrode plate are separated by a separator, and the portion of the separator that extends beyond the cathode electrode plate and the anode electrode plate is referred to as a separator protrusion 28. It should also be understood that FIG. 2a shows the case where the buffer layer 22 is located at the top seal of the electrode assembly 20, but the position of the separator protrusion 28 and the buffer layer 22 is not limited thereto, for example, the buffer layer 22 may be arranged at the separator protrusion 28 of the other side opposite the top seal of the electrode assembly as shown in FIG. 2c, FIG. 3c, etc., and may also be determined according to other practical needs.

In the battery provided by the present application, a buffer layer 22 is arranged on the separator protrusion 28 of the electrode assembly 20. Since the buffer layer 22 has an elastic buffering effect, the buffer layer 22 may absorb the impact kinetic energy of the electrode assembly 20 and the impact force on the electrode assembly 20 during the falling process of the battery, prevent the battery from directly colliding with the separator protrusion 28 (e.g. a separator protrusion at the top seal) of the electrode assembly 20 during the falling process, slow down the impact and wear on the electrode assembly plate and separator, and avoid the risk of internal short circuit caused by displacement between the cathode and anode electrode plates of the electrode assembly and shrinkage of the separator (the improvement at the top seal is especially obvious), thereby enhancing the battery's impact resistance performance and improving the battery's drop resistance performance, further improving the battery safety performance.

Figure 2A:
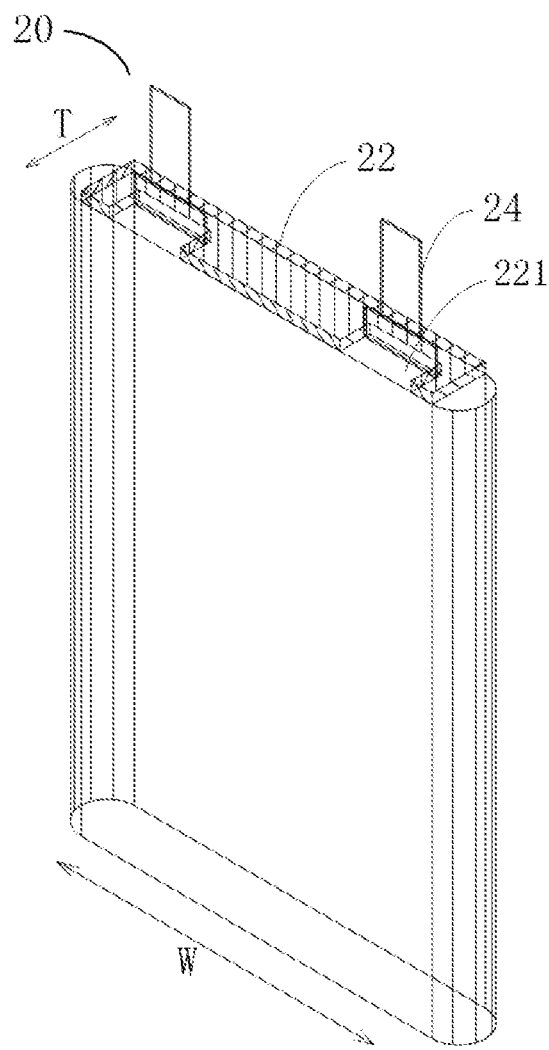
FIG. 2a illustrates a front elevational view of an electrode assembly according to an embodiment of the present application.
Figure 2B:
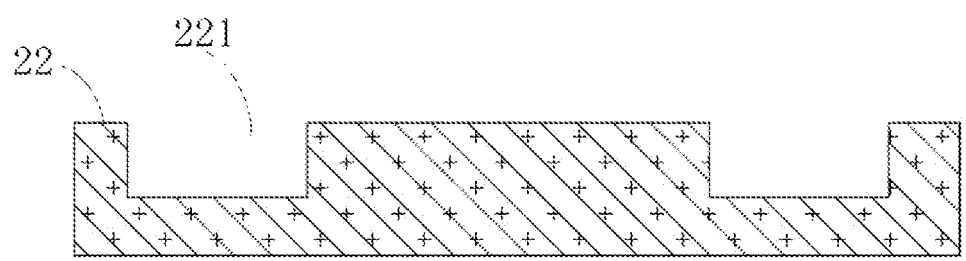
Figure 2C:
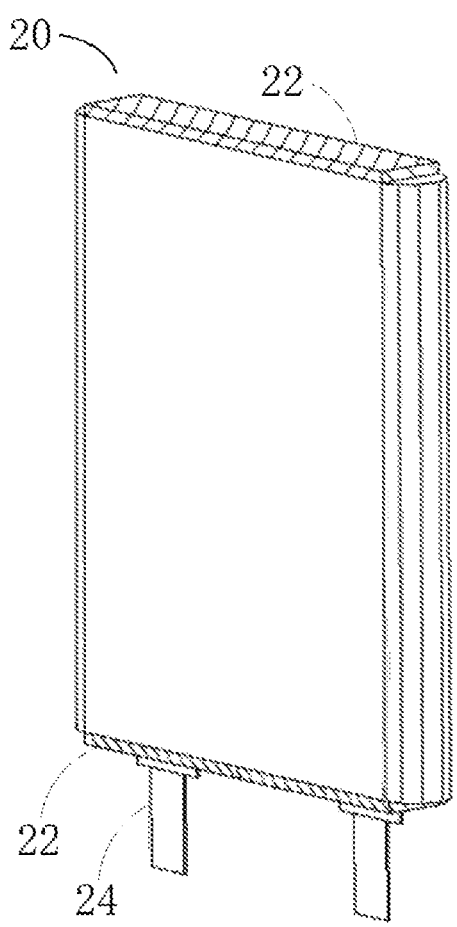
FIG. 2c illustrates view of the electrode assembly in FIG. 2a added with a buffer layer.
Figure 3A:
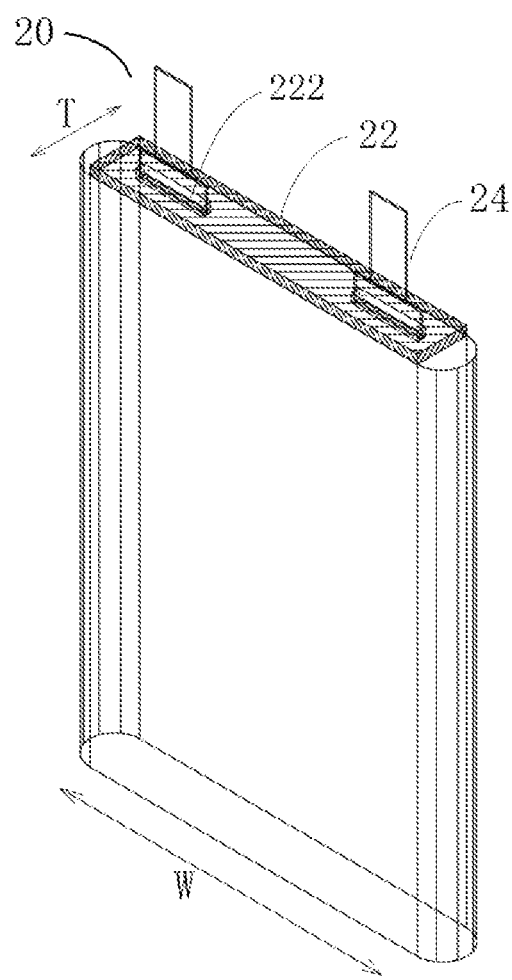
FIG. 3a illustrates a front elevational view of an electrode assembly according to another embodiment of the present application.
Figure 3B:
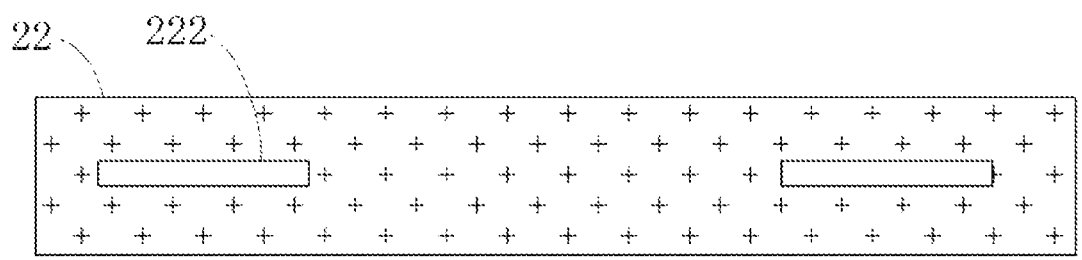
Figure 3C:
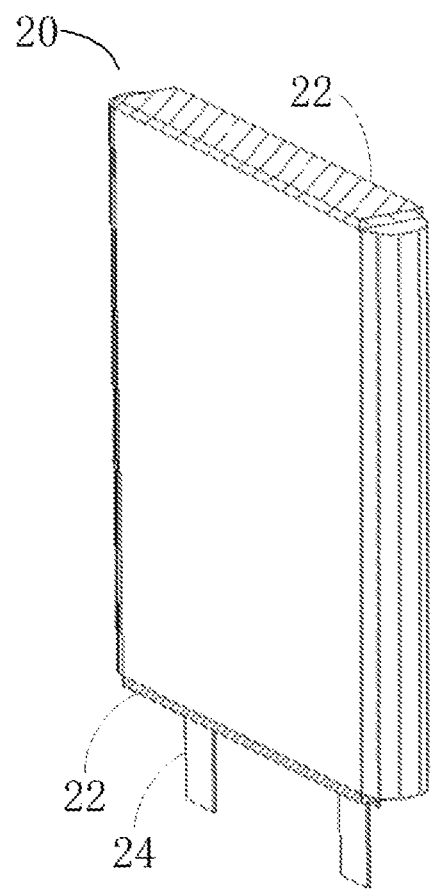
FIG. 3c illustrates view of the electrode assembly in FIG. 3a added with a buffer layer.
Figure 3D:
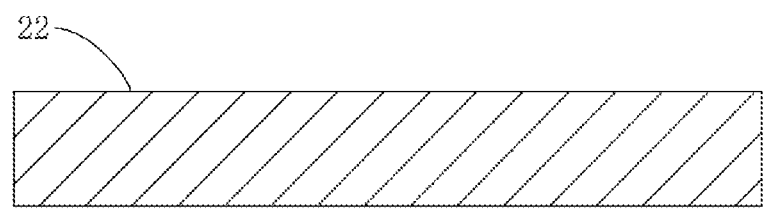
FIG. 3d illustrates a top view of the buffer layer added in FIGS. 2c and 3c.
Figure 4:
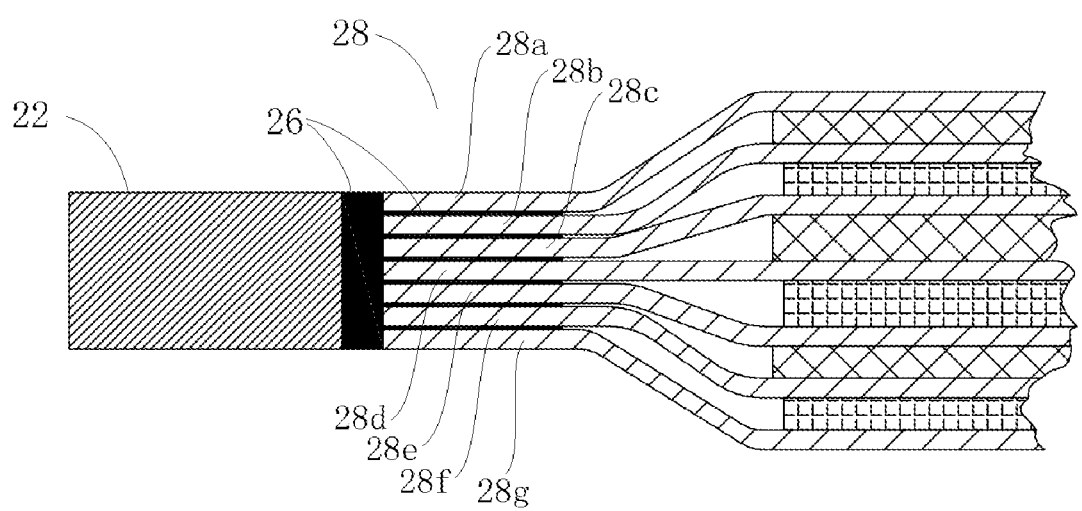
FIG. 4 illustrates a connection manner between the buffer layer and the separator protrusion.

Further, as shown in conjunction with FIGS. 2a to 4, wherein, as shown in FIGS. 2c, 3a, 3b, 3c, 3d and 4, similar components have the same reference numerals as shown in FIGS. 2a and 2b. The electrode assembly 20 further includes an adhesive layer 26, and the buffer layer 22 is adhered to the separator protrusion 28 by the adhesive layer 26. Among them, the separator protrusion 28 includes a first separator protrusion 28a and a second separator protrusion 28b, and the adhesive layer 26 extends between the first separator protrusion 28a and the second separator protrusion 28b. It should be understood that, as shown in FIG. 4, when the first separator protrusion is 28a, the second separator protrusion may be at least one of 28b, 28c, 28d, 28e, 28f, and 28g, and at the same time the adhesive layer 26 may extend between 28a and at least one of 28b, 28c, 28d, 28e, 28f and 28g; when the first separator protrusion is 28b, the second separator protrusion may be at least one of 28a, 28c, 28d, 28e, 28f, and 28g; when the first separator protrusion is other, the case for the second separator protrusion can be deduced in this way. That is, the first separator protrusion may be one or more of 28a, 28b, 28c, 28d, 28e, 28f, and 28g in FIG. 4, and the second separator protrusion may be another separator protrusion other than the first separator protrusion of 28a, 28b, 28c, 28d, 28e, 28f, and 28g, for example, when the first separator protrusion is 28a, 28c, 28e or 28g, the second separator protrusion may be 28b, 28d or 28f. In addition, the first separator protrusion and the second separator protrusion may be adjacently distributed or spaced apart, and description about this will not be conducted in detail herein.

It should also be understood that the number of separator protrusions is not limited thereto and may be determined according to actual needs. The adhesive layer 26 may overflow when the electrode assembly is forming, then the adhesive layer 26 may extend between the first separator protrusion 28a and the second separator protrusion 28b, so that the buffer layer 22 and the separator protrusion 28 may be more firmly bonded together, thus the impact resistance performance of the electrode assembly plate and the separator at the separator protrusion 28 may be further enhanced and the separator may be further prevented from contracting. At the same time, the impact of the electrolytic solution on the separator protrusion 28 may be protected, thereby further avoiding the risk of internal short circuit inside the battery, further enhancing the impact resistance performance of the battery and improving the drop resistance performance of the battery, thereby further improving the safety of the battery, and the head collapse of the package aluminum foil is improved to some extent and the risk of short circuit caused by tearing the aluminum foil inside the electrode assembly is avoided.

With reference to FIGS. 2a and 2b again, a front view of an electrode assembly and a top view of a buffer layer of an embodiment of the present application are respectively shown. In the present embodiment, the battery provided by the present application further comprises an electrode tab 24, and the buffer layer 22 has a notch 221, the electrode tab 24 passes through the notch 221. The notch 221 of the buffer layer 22 may be understood as being recessed from one side of the electrode assembly 20 to the other side in the thickness direction T of the electrode assembly 20, wherein the recessed directions between the notches 221 may be opposite to each other. The position of the notch 221 may be determined based on the actual position of the electrode tab 24 of the electrode assembly 20. In addition, another buffer layer 22 may be further arranged on the electrode assembly 20, and the buffer layer 22 and the buffer layer 22 having the notch 221 may be respectively arranged at opposite ends of the electrode assembly 20, as shown in FIG. 2c.

Among them, the specific width of the notch 221 may be determined based on the width of the electrode tab 24. It should be noted that the length direction of the notch 221 is a direction parallel to the width direction W of the electrode tab 24, and the width direction of the electrode tab 24 is the width direction W of the electrode assembly 20. In some embodiments, the length of the notch 221 may be between 1 mm and 10 mm greater than the width of the electrode tab 24, and may include 1 mm and 10 mm. Such an arranging manner and a width of the notch may satisfy the battery with electrode tabs arranged in multiple intervals, and may be convenient for the buffer layer 22 to be fixed and easy to operate.

With reference to FIGS. 3a and 3b, a front view of an electrode assembly and a top view of a buffer layer of another embodiment of the present application are respectively shown. In the present embodiment, the buffer layer 22 has a through hole 222, the electrode tab 24 passes through the through hole 222 so that the electrode tab 24 extends outward. As shown in FIG. 3b, the through hole 222 may have a rectangular shape or a rectangular shape with a circular arc shape at four corners, and may have other shapes. It should be understood that the shape may be any one as long as the through hole 222 allows the electrode tab 24 to pass through. Among them, the position of the through hole 222 may be determined based on the actual position of the electrode tab 24 of the electrode assembly 20. In addition, another buffer layer 22 may be further arranged on the electrode assembly 20, and the buffer layer 22 and the buffer layer 22 having the through hole 222 may be respectively arranged at opposite ends of the electrode assembly 20, as shown in FIG. 3c.

Among them, the specific width of the through hole 222 may be determined based on the width of the electrode tab 24. It should be noted that the length direction of the through hole 222 is a direction parallel to the width direction W of the electrode tab 24. In some embodiments, the length of the through hole 222 may be between 1 mm and 10 mm greater than the width of the electrode tab 24. Such an arranging manner and a width of the through hole may satisfy the battery with electrode tabs arranged in multiple intervals, and may be convenient for the buffer layer 22 to be fixed and easy to operate.

It should be understood that the setting of the adhesive layer 26 is not limited by the manner in which the notch 221 of the buffer layer 22 or the through hole 222 is arranged, and the arranging manner for the notch 221 or the through hole 222 illustrated in FIGS. 2a to 3b, and other manners. The buffer layer 22 may be fixed to the electrode assembly 20 by arranging the adhesive layer 26, so that the separator protrusion 28 is firmly bonded to further prevent the separator from contracting. In an embodiment of the present application, the material of the adhesive layer 26 may be a polyurethane or a polyacrylate colloid. In an embodiment of the present application, the thickness of the adhesive layer 26 may range from 5 μm to 100 μm; if the thickness of the adhesive layer 26 is less than 5 μm, the effect of further preventing the shrinkage of the separator may not be obtained, and if the thickness of the adhesive layer 26 is greater than 100 μm, the energy density of the electrode assembly 20 may be affected.

In an embodiment of the present application, the material of the buffer layer 22 includes an elastic substance. In an embodiment of the present application, the elastic substance may be a rubber pad or a foam, so that the buffer layer 22 has elasticity and may achieve a good buffering effect during the falling process of the battery.

Specifically, the material of the above elastic rubber pad should have the characteristics of softness, insulation, high temperature resistance, electrolyte corrosion resistance, stable electrochemical performance, and the like, and should not be side-reacted with other substances in the battery. In an embodiment of the present application, the material of the rubber pad may be at least one selected from a group consisting of polyvinylidene fluoride, polyethylene, polypropylene, styrene butadiene rubber and organic silica gel. In an embodiment of the present application, a thickness of the rubber pad may be between 0.1 mm and 5 mm. It should be understood that in the battery of the present application, the material and thickness of the buffer layer 22 may vary depending on the actual application, and the present application is not limited thereto.

In an embodiment of the present application, the buffer layer 22 has an elastic modulus between 1 MPa and 1000 MPa, so that the buffer layer 22 is caused to have an appropriate elastic deformation during the falling process of the battery to buffer the impact force of the battery when the battery is falling down.

With reference to FIGS. 2a, 2c, 3a and 3c, the specific length of the buffer layer 22 may be determined according to the width of the electrode assembly 20. The length of the buffer layer 22 may be the same as the width of the electrode assembly 20, or the length of the buffer layer 22 may be less than the width of the electrode assembly 20. In an embodiment of the present application, the length of the buffer layer 22 may be between 0 mm and 10 mm less than the width of the electrode assembly 20, and the range includes 0 mm and 10 mm, wherein the length direction of the buffer layer 22 is a direction parallel to the width direction W of the electrode assembly 20.

Figure 5A:
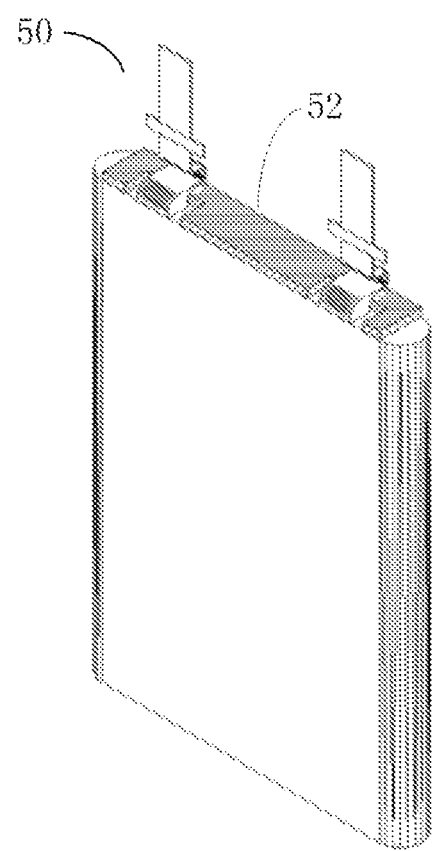
FIG. 5a illustrates a front elevational view of an electrode assembly in multi-tab structure according to an embodiment of the present application.
Figure 5B:
Figure 5C:
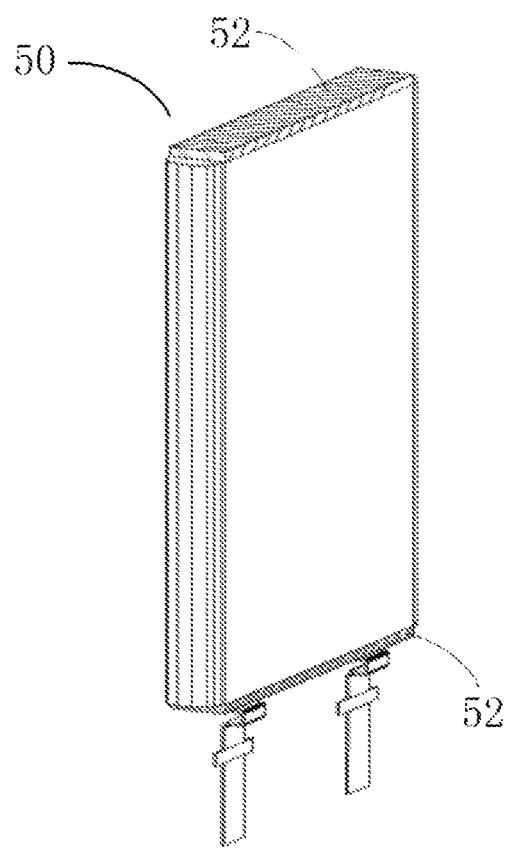
FIG. 5c illustrates a view of the electrode assembly in FIG. 5a added with a buffer layer.

In an embodiment of the present application, the electrode assembly 20 may be a single tab structure or a multi-tab structure. FIG. 2a illustrates a battery 20 in a single tab structure having the buffer layer 22. The electrode assembly 20 of the single tab structure refers to an electrode assembly structure having one positive electrode tab and one negative electrode tab. FIGS. 5a and 5b illustrates a battery 50 in a multi-tab structure having a buffer layer 52. The electrode assembly 50 of the multi-tab structure refers to an electrode assembly structure having at least one positive electrode tab and at least one negative electrode tab. In addition, both the electrode assemblies in a single tab structure and in a multi-tab structure may be an electrode assembly in a wound structure, in a laminated structure or an electrode assembly in which the wound structure is combined with the laminated structure. The position for the through hole or notch of the buffer layer 52 of the electrode assembly 50 in a multi-tab structure may be similar to that for the through hole or notch of the buffer layer 22 of the electrode assembly 20 in a single tab structure, and description may not be conducted in detail herein. In addition, another buffer layer 52 may be further arranged on the electrode assembly, and the buffer layer 52 and the buffer layer 52 having the through hole or notch may be respectively arranged at opposite ends of the electrode assembly 50, as shown in FIG. 5c. By arranging the buffer layer 52 in the electrode assembly 50 in a multi-tab structure, it is possible to prevent the short circuit of the multi-tab inside the electrode assembly 50 caused by direct contact between the electrode tab and the electrode plate during the adapter welding process, thereby improving the safety performance of the battery and omitting the existing protective adhesive on the back of the electrode tab.

Figure 6:
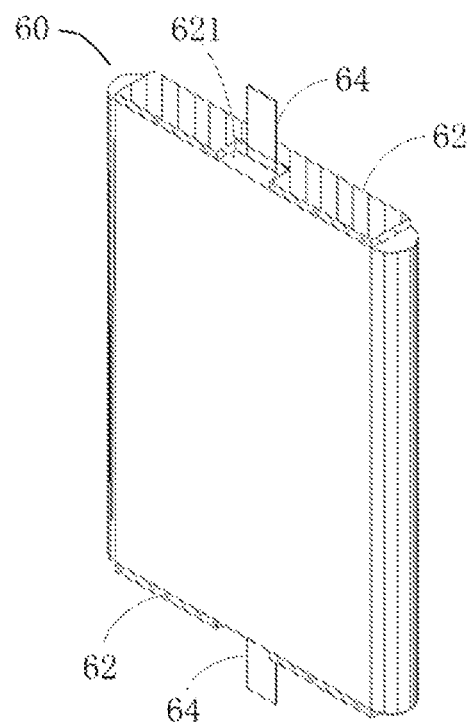
FIG. 6 illustrates a view of a single tab on different sides of the electrode assembly, according to an embodiment of the present application.

In an embodiment of the present application, in the case where a single tab 64 is on different sides of the electrode assembly 60 as illustrated in FIG. 6, a buffer layer 62 may be provided on the corresponding side of each of the electrode tabs 64, or a buffer layer 62 may be provided on a side of a corresponding one of the electrode tabs 64, and the buffer layer 62 has a notch 621 that can accommodate the electrode tabs 64.

Figure 7:
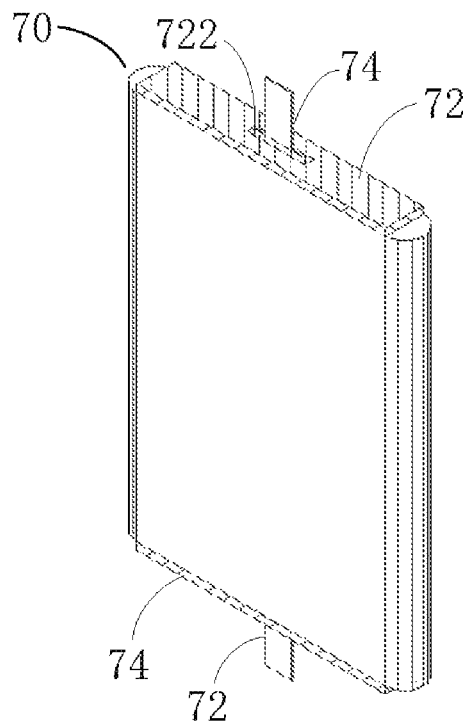
FIG. 7 illustrates a view of a single tab on different sides of the electrode assembly, according to another embodiment of the present application.

In an embodiment of the present application, in the case where a single tab 74 is on different sides of the electrode assembly 70 as illustrated in FIG. 7, a buffer layer 72 may be provided on the corresponding side of each of the electrode tabs 74, or a buffer layer 72 may be provided on a side of a corresponding one of the electrode tabs 74, and the buffer layer 72 has a through hole 722 that can accommodate the electrode tabs 74. In addition, the structure shown in FIGS. 6 and 7 may also be applied to an electrode assembly having a multi-tab structure, and may also be applied to the electrode assembly having a single tab or multi-tab with a wound structure, a laminated structure or a combination of the wound structure and the laminated structure.

In order to characterize the technical effects that can be brought about by the technical solution of the present application, the battery of the electrode assembly structure shown in FIG. 2a is selected, and the battery of the electrode assembly structure shown in FIG. 1 of the prior art is subjected to a drop test. Specifically, the following drop test conditions are adopted: (1) after the electrode assembly is fully charged, the internal resistance and voltage of the electrode assembly are recorded; (2) the electrode assembly is clamped in the corresponding fixture, and it is dropped from a height of 1 m with the 6 sides and 4 corners being dropped once for a total of 10 times, the above is 1 cycle, and 5 cycles are required, for a total of 50 drops; (3) after the drop is completed, the electrode assembly is placed at room temperature for 24 hours, and then the internal resistance and voltage of the electrode assembly are measured. At the same time, the following conditions are used to determine whether the electrode assembly has passed the drop test: (1) whether the electrode assembly does not ignite, does not explode, does not leak liquid; (2) whether the voltage difference A V before and after the dropping of electrode assembly is ≤0.1V, the resistance change rate before and after the dropping of electrode assembly is ≤±5%; When the electrode assembly after dropping 50 times satisfies the above two conditions, it can be judged that the electrode assembly passes the drop test. The specific drop test results are shown in Table 1.

TABLE 1

Comparison for the drop test results between the batteries employing the electrode assembly structures shown in FIGS. 1 and 2a

| Groups | battery of the structure in FIG. 1 | battery of the structure in FIG. 2a |
|---|---|---|
| drop test | 5/10 pass | 9/10 pass |

It can be concluded from Table 1 that an average of 5/10 of the electrode assemblies using the electrode assembly structure shown in FIG. 1 of the prior art may pass the drop test, and an average of 9/10 of the battery using the electrode assembly structure of FIG. 2a in the present application may pass the drop test. When the batteries using the electrode assembly structures of FIGS. 2c, 3c, 5a, 5c, 6 and 7 of the present application is compared with the corresponding batteries with existing electrode assembly structures for the drop test, the same comparison results as above (such as the results of Table 1) may also be obtained. In summary, compared with the prior art, the electrode assembly with the buffer layer protection structure of the present application may effectively improve the drop performance of the battery (such as a soft pack lithium ion battery), thereby improving the safety performance of the battery.

In addition, according to another aspect of the present application, an electronic device (not shown) is further provided comprising: a case and a battery disposed in the case; the battery is used to supply power to the electronic device and comprises:

an electrode assembly 20 having at least one separator protrusion 28;

a package bag for accommodating the electrode assembly 20; and a buffer layer 22 arranged between the electrode assembly 20 and the package bag;

wherein the buffer layer 22 is further arranged on the at least one separator protrusion 28. The battery provided by the present application may be provided in a variety of electronic devices, which may be any electronic device known in the art. For example, the electronic device may be a smart phone, a digital display, a watch, a monitor, a player, a controller, a drone, a robot, and the like. The individual battery assembly provided by the present application may be assembled into a battery pack and then used in a variety of electronic devices, and the manner of use thereof is not limited.

In the description of the present specification, the description with reference to the terms "one embodiment", "some embodiments", "illustrative embodiment", "example", "specific example", or "some examples", etc. means that the specific features, structures, materials, or characteristics described in connection with the embodiments or examples are included in at least one embodiment or example of the present application. In the present specification, the schematic representation of the above terms does not necessarily refer to the same embodiment or example. Furthermore, the particular features, structures, materials, or characteristics described may be combined in a suitable manner in any one or more embodiments or examples.

The above description is only the preferred embodiment of the present application and is not intended to limit the present application. Although the preferred embodiments of the present application have been shown and described, it can be understood that a person skilled in the art can make various changes, modifications, substitutions and variations to the embodiments without departing from the principle and spirit of the present application; and the scope of the present application is defined by the attached claims and equivalents thereof.

What is claimed is:

1. A battery, comprising:
    an electrode assembly having at least one separator protrusion;
    a package bag for accommodating the electrode assembly; and
    a buffer layer arranged between the electrode assembly and the package bag;
    an adhesive layer arranged between the buffer layer and the at least one separator protrusion;
    wherein the buffer layer is adhered to the at least one separator protrusion by the adhesive layer.

2. The battery according to claim 1, wherein the at least one separator protrusion includes a first separator protrusion and a second separator protrusion, and the adhesive layer extends between the first separator protrusion and the second separator protrusion.

3. The battery according to claim 1, further comprising an electrode tab, the buffer layer has a notch, the electrode tab passes through the notch.

4. The battery according to claim 3, wherein the length of the notch is between 1 mm and 10 mm greater than the width of the electrode tab.

5. The battery according to claim 1, further comprising an electrode tab, the buffer layer has a through hole, the electrode tab passes through the through hole.

6. The battery according to claim 5, wherein the length of the through hole is between 1 mm and 10 mm greater than the width of the electrode tab.

7. The battery according to claim 1, wherein the buffer layer has an elastic modulus between 1 MPa and 1000 MPa.

8. The battery according to claim 1, wherein the length of the buffer layer is between 0 mm and 10 mm less than the width of the electrode assembly.

9. The battery according to claim 1, wherein a thickness of the buffer layer is between 0.1 mm and 5 mm.

10. The battery according to claim 1, wherein the material of the buffer layer includes an elastic substance.

11. The battery according to claim 10, wherein the elastic substance is a rubber pad, and the material of the rubber pad is at least one selected from a group consisting of polyvinylidene fluoride, polyethylene, polypropylene, styrene butadiene rubber and organic silica gel.

12. An electronic device, comprising: a case and a battery disposed in the case; the battery comprises:
    an electrode assembly having at least one separator protrusion;
    a package bag for accommodating the electrode assembly; and
    a buffer layer arranged between the electrode assembly and the package bag, an adhesive layer between the buffer and the at least one separator protrusion;

wherein the buffer layer is further adhered to the at least one separator protrusion by the adhesive layer.

13. The electronic device according to claim 12, wherein the at least one separator protrusion includes a first separator protrusion and a second separator protrusion, and the adhesive layer extends between the first separator protrusion and the second separator protrusion.

14. The electronic device according to claim 12, further comprising an electrode tab, the buffer layer has a notch, the electrode tab passes through the notch.

15. The electronic device according to claim 14, wherein the length of the notch is between 1 mm and 10 mm greater than the width of the electrode tab.

16. The electronic device according to claim 12, further comprising an electrode tab, the buffer layer has a through hole, the electrode tab passes through the notch.

17. The electronic device according to claim 16, wherein the length of the through hole is between 1 mm and 10 mm greater than the width of the electrode tab.

18. The electronic device according to claim 12, wherein a thickness of the buffer layer is between 0.1 mm and 5 mm.

19. The electronic device according to claim 12, wherein the material of the buffer layer includes an elastic substance.

20. The electronic device according to claim 19, wherein the elastic substance is a rubber pad, and the material of the rubber pad is at least one selected from a group consisting of polyvinylidene fluoride, polyethylene, polypropylene, styrene butadiene rubber and organic silica gel.

* * * * *